(12) United States Patent
Williams et al.

(10) Patent No.: US 9,695,267 B2
(45) Date of Patent: Jul. 4, 2017

(54) FOAMS AND FOAMABLE COMPOSITIONS CONTAINING HALOGENATED OLEFIN BLOWING AGENTS

(75) Inventors: David J. Williams, East Amherst, NY (US); Clifford P. Gittere, Amherst, NY (US); Michael Van Der Puy, Amherst, NY (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 12/847,381

(22) Filed: Jul. 30, 2010

(65) Prior Publication Data

US 2011/0039964 A1    Feb. 17, 2011

Related U.S. Application Data

(60) Provisional application No. 61/232,836, filed on Aug. 11, 2009.

(51) Int. Cl.
| | | |
|---|---|---|
| C08G 18/18 | (2006.01) | |
| C08J 9/14 | (2006.01) | |
| C08G 101/00 | (2006.01) | |

(52) U.S. Cl.
CPC ..... *C08G 18/1808* (2013.01); *C08G 18/1816* (2013.01); *C08J 9/144* (2013.01); *C08J 9/146* (2013.01); *C08G 2101/00* (2013.01); *C08G 2101/005* (2013.01); *C08G 2105/02* (2013.01); *C08J 2375/04* (2013.01)

(58) Field of Classification Search
CPC .................................................... C08J 9/144
USPC .................... 521/119, 131, 133, 155, 170
See application file for complete search history.

(56) References Cited

U.S. PATENT DOCUMENTS

| | | |
|---|---|---|
| 3,001,973 A | 9/1961 | Piepenbrink et al. |
| 3,124,605 A | 3/1964 | Wagner |
| 3,201,372 A | 8/1965 | Wagner et al. |
| 3,277,138 A | 10/1966 | Holtschmidt et al. |
| 3,394,164 A | 7/1968 | McClellan et al. |
| 3,401,190 A | 9/1968 | Schmitt et al. |
| 3,454,606 A | 7/1969 | Brotherton et al. |
| 3,492,330 A | 1/1970 | Trecker et al. |
| 4,487,816 A | 12/1984 | Smith |
| 4,868,224 A | 9/1989 | Harasin et al. |
| 5,300,531 A | 4/1994 | Weaver |
| 5,721,285 A * | 2/1998 | Nakamoto et al. ........... 521/131 |
| 5,762,822 A | 6/1998 | Tucker |
| 6,395,796 B1 | 5/2002 | Ghobary |
| 6,403,847 B1 | 6/2002 | Nakada et al. |
| 6,844,475 B1 | 1/2005 | Tung et al. |
| 7,189,884 B2 | 3/2007 | Mukhopadhyay et al. |
| 7,230,146 B2 | 6/2007 | Merkel et al. |
| 7,279,451 B2 * | 10/2007 | Singh et al. ................... 510/412 |
| 2002/0004563 A1 * | 1/2002 | Muhlfeld ........... C08G 18/0895 525/457 |
| 2006/0173128 A1 * | 8/2006 | Connolly ...................... 524/589 |
| 2007/0100009 A1 | 5/2007 | Creazzo et al. |
| 2009/0099272 A1 | 4/2009 | Williams et al. |
| 2009/0099274 A1 | 4/2009 | Van der Puy et al. |
| 2009/0124719 A1 | 5/2009 | Creazzo et al. |

FOREIGN PATENT DOCUMENTS

| | | |
|---|---|---|
| CN | 101014680 A | 8/2007 |
| WO | WO 2007/002703 A2 | 1/2007 |
| WO | WO-2008121783 A1 * | 10/2008 |

OTHER PUBLICATIONS

Supplementary European Search Report EP Application No. EP 10 80 8524.2-1306 / 2464684, dated Apr. 16, 2014, 4 pages.
Search Report CN Application No. 201080045617.5 dated Mar. 12, 2013, 2 pages.

* cited by examiner

*Primary Examiner* — Melissa Rioja
(74) *Attorney, Agent, or Firm* — Colleen D. Szuch

(57) ABSTRACT

The invention provides foam forming methods that comprise: (a) preparing a foamable system comprising at least one hydrohaloolefin; and (b) ensuring either (i) the substantial absence of long-term decomposition-inducing contact between said hydrofluoroolefin and an amine-containing catalyst; (ii) that an effective amount of surfactant is available in the system under conditions which prevent long term exposure of the surfactant to a long-term decomposition reaction environment; or (iii) a combination of (i) and (ii). Related methods, foamable systems and foams are also disclosed. Preferred embodiments provide polyurethane and polyisocyanurate foams and methods for the preparation thereof, including closed-celled, polyurethane and polyisocyanurate foams and methods for their preparation. The preferred foams are characterized by a fine uniform cell structure and little or no foam collapse. The foams are preferably produced with a polyol premix composition which comprises a combination of a hydrohaloolefin blowing agent, a polyol, a silicone surfactant, a catalyst and is further characterized by being substantially free of added water.

9 Claims, No Drawings

FOAMS AND FOAMABLE COMPOSITIONS CONTAINING HALOGENATED OLEFIN BLOWING AGENTS

CROSS REFERENCE TO RELATED APPLICATION

This application claims the benefit of U.S. Provisional patent application Ser. No. 61/232,836 filed Aug. 11, 2009, which is incorporated herein by reference.

BACKGROUND OF THE INVENTION

Field of the Invention

The present invention pertains to foams and methods for the preparation thereof, and in particular to polyurethane and polyisocyanurate foams and methods for the preparation thereof.

Description of the Related Art

The class of foams known as low density, rigid to semi-rigid polyurethane or polyisocyanurate foams has utility in a wide variety of insulation applications, including roofing systems, building panels, building envelope insulation, spray applied foams, one and two component froth foams, insulation for refrigerators and freezers, and so called integral skin foam for cushioning and safety application such as steering wheels and other automotive or aerospace cabin parts, shoe soles, and amusement park restraints. An important factor in the large-scale commercial success of many rigid to semi-rigid polyurethane foams has been the ability of such foams to provide a good balance of properties. In general, rigid polyurethane and polyisocyanurate foams are known to provide outstanding thermal insulation, excellent fire resistance properties, and superior structural properties at reasonably low densities. Integral skin foams are known to produce a tough durable outer skin and a cellular, cushioning core.

As is known, blowing agents are used to form the cellular structure required for such foams. It has been common to use liquid fluorocarbon blowing agents because of their ease of use and ability to produce foams with superior mechanical and thermal insulation properties. Fluorocarbons not only act as blowing agents by virtue of their volatility, but also are encapsulated or entrained in the closed cell structure of the rigid foam and are generally the major contributor to the low thermal conductivity properties of the rigid urethane foams. The use of fluorocarbon as the preferred commercial expansion or blowing agent in insulating foam applications is based in part on the resulting k-factor associated with the foam produced. The k-factor provides a measure of the ability of the foam to resist the transfer of heat through the foam material. As the k-factor decreases, this is an indication that the material is more resistant to heat transfer and therefore a better foam for insulation purposes. Thus, materials that produce lower k-factor foams are desirable and advantageous.

It is known in the art to produce rigid or semi-rigid polyurethane and polyisocyanurate foams by reacting one or more polyisocyanate(s) with one or more polyol(s) in the presence of one or more blowing agent(s) one or more catalyst(s) and one or more surfactant(s). Water is commonly used as a blowing agent in such systems. Other blowing agents which have been used include hydrocarbons, fluorocarbons, chlorocarbons, chlorofluorocarbons, hydrochlorofluorocarbons, halogenated hydrocarbons, ethers, esters, aldehydes, alcohols, ketones, organic acid or gas, most often $CO_2$, generating materials. Heat is generated when the polyisocyanate reacts with the polyol, and this heat tends to volatilize the blowing agent contained in the liquid mixture, thereby forming bubbles therein as the foaming reaction proceeds. In the case of gas generating materials, gaseous species are generated by thermal decomposition or reaction with one or more of the ingredients used to produce the polyurethane or polyisocyanurate foam. As the polymerization reaction proceeds, the liquid mixture becomes a cellular solid, entrapping the blowing agent in the cells as they are formed.

The purpose of the surfactant in the foamable composition is to help ensure the formation of a cellular structure that is conducive to good thermal insulation properties. The surfactant(s) tend to hold the blowing agent within the foam as the liquid foamable mixture solidifies and to thereby aid in the formation of smaller, more regular cells. If surfactant is not used in the foaming composition, the bubbles tend to simply pass through the liquid mixture without forming a foam or forming a foam with undesirably large, irregular cells.

In addition to the important performance characteristics mentioned above, it has become increasingly important for the blowing agent(s) used in foamable compositions to have low global warming potential. Previous applications illustrate the use of hydrohaloolefins (HFOs) as desirable blowing agents, particularly trans-1,3,3,3-tetrafluoropropene (HFO-1234ze(E)) and trans-1-chloro-3,3,3-trifluoropropene (HCFO-1233zd(E)). Processes for the manufacture of trans-1,3,3,3-tetrafluoropropene are disclosed in U.S. Pat. Nos. 7,230,146 and 7,189,884. Processes for the manufacture of trans-1-chloro-3,3,3-trifluoropropene are disclosed in U.S. Pat. Nos. 6,844,475 and 6,403,847.

It is convenient in many applications to provide the components for polyurethane or polyisocyanurate foams in pre-blended formulations. Most typically, the foam formulation is pre-blended into two components. The polyisocyanate and optionally isocyanate compatible raw materials, including but not limited to certain blowing agent(s) and non-reactive surfactant(s), comprise the first component, commonly referred to as the "A" component or "A side." A polyol or mixture of polyols, one or more surfactant(s), one or more catalyst(s), one or more blowing agent(s), and other optional component(s), including but not limited to flame retardants, colorants, compatibilizers, and solubilizers, comprise the second component, commonly referred to as the "B" component or "B side." Accordingly, polyurethane or polyisocyanurate foams are readily prepared by bringing together the A side and the B side components either by hand mix for small preparations and, preferably, machine mix techniques to form blocks, slabs, laminates, pour-in-place panels and other items, spray applied foams, froths, and the like. Optionally, other ingredients such as fire retardants, colorants, auxiliary blowing agents, and other polyols can be added to the mixing head or reaction site. Most conveniently, however, they are all incorporated into one B component.

SUMMARY OF THE INVENTION

While the above-mentioned hydrohaloolefins have many advantageous features and characteristics when used as blowing agents, applicants have come to recognize the existence of a potentially serious shortcoming of certain foam systems which utilize certain of such hydrohaloolefins. More particularly, applicants have found that a problem may arise with the long term stability, and hence the shelf life, of foamable systems in which hydrofluoroolefins, and in particular certain hydrofluoroolefins such as HFO-1234ze(E) and HFCO-1233zd(E), are used as the blowing agent.

As mentioned above, it has heretofore been common to place the blowing agent(s), the catalyst(s) and the surfactant(s) together in a B side of a foamable system. Applicants have found that hydrofluoroolefins, including particularly HFO-1234ze(E) and HFCO-1233zd(E), can decompose or react under certain conditions to a detrimental extent over time when in the presence of certain catalysts, including particularly amine-containing catalysts, that are commonly used in many B side formulations. Applicants have found that one such condition in which detrimental decomposition can occur is when water is present in the composition in amounts that have been heretofore typically used in such blowing agent systems.

Accordingly, applicants have come to appreciate that in certain situations and/or systems, particularly when water or another polar solvent is present as an additive in the system or the blowing agent composition, the long-term stability of the composition can decrease markedly and to a highly detrimental extent. Although applicants do not intend to be bound necessarily to a theory of operation, it is believed that the rate of the decomposition reaction is increased substantially when water is present in typical co-blowing agent amounts. Accordingly, the presence of added water, for example in amounts greater than about 1% by weight of the B side composition, tends to greatly exacerbate the stability problem which arises from the presence together of hydrofluoroolefin and catalyst-effective amounts of amine-containing catalysts.

Moreover, applicants have also found that the above-noted interaction between the hydrohaloolefins and the amine produces a negative effective on the performance of surfactants, including particularly silicon-containing surfactants, which are present in such compositions. Once again, although applicants do not intend to be bound by or to any particular theory of operation, it is believed that the decomposition reaction produces fluorine ions as a byproduct, and that exposure of surfactant compounds, particularly silicon-surfactant compounds, to such fluorine ions causes over time a degradation of the molecular weight of the surfactant, which in turn negatively effects the ability of the surfactant to promote proper cell formation.

According to one aspect of the present invention, therefore, applicants have developed foam forming methods that comprise: (a) preparing a foamable system comprising at least one hydrohaloolefin; (b) ensuring either (i) the substantial absence of long-term decomposition-inducing contact between said hydrofluoroolefin and the amine-containing catalyst; (ii) that an effective amount of surfactant is available in the system under conditions which prevent long term exposure of the surfactant to a long-term decomposition reaction environment; or (iii) a combination of (i) and (ii).

As used herein, the term "long-term decomposition-inducing contact" means periods of at least several days, and in many preferred embodiments several weeks or even several months, during which the hydrohaloolefin and the amine-containing catalyst are in the same composition under conditions that permit the decomposition reaction to proceed to a significant extent.

As used herein, the term "effective amount of surfactant" means, for a particular surfactant and a particular foamable system, an amount of surfactant that is effective to substantially aid in the formation of regular, insulation-effective cells.

As used herein, the term "long-term exposure" means such exposure as would normally occur in a storage environment. For the purposes of comparison, for example, exposure of the surfactant to the hydrohaloolefin and the amine-containing catalyst as would normally occurring during mixing of the A side and the B side of a two component system would not constitute "long-term exposure." On the other hand, storage of a composition for a period of at least several days, preferably at least several weeks, and even more preferably at least several months, would constitute "long-term exposure"

Applicants contemplate that many particular features, characteristics and means for carrying out the ensuring step of the present invention will be apparent and available without undue experimentation to those skilled in the art in view of the disclosure contained herein, and all such particular features, characteristics and means are within the broad scope of the present invention. By way of example, applicants have developed several embodiments for the ensuring step of the present invention, and each embodiment can be adapted for use alone or in combination with one or more of the other embodiments disclosed herein and/or with other embodiments, including those which have yet to be developed. One such preferred embodiment of the present methods involves: providing a foamable system comprising an A side and a B side type foaming system in which the B side comprises a catalytically effective amount of an amine-containing catalyst and at least one hydrohaloolefin that is generally decomposition reactive with said amine-containing catalyst; and ensuring that said B side contains a sufficient absence of a polar solvent, preferably a sufficient absence of water, to ensure that there is no substantial decomposition reaction between the hydrofluoroolefin and the amine after long-term exposure, including preferably after about two months, more preferably after about three months, and even more preferably after about six months of storage at ambient temperature conditions. In certain embodiments, it is preferred to ensure that the B side composition comprises a hydrohaloolefin, and in particular a decomposition reactive hydrofluoroolefin such as trans-1, 3,3,3-tetrafluoropropene (HFO-1234ze(E)) and trans-1-chloro-3,3,3-trifluoropropene (HCFO-1233zd(E)) and a catalytic effective amount of amine-containing catalyst, and not more than about 1 weight % water, more preferably not more than 0.75 weight % water, and even more preferably not more than 0.5 weight % water.

In other aspects, the present methods involve: providing a foamable system comprising an A side and a B side type foaming system in which the B side comprises a catalytically effective amount of an amine-containing catalyst and at least one hydrohaloolefin that is generally decomposition reactive with said amine-containing catalyst; and ensuring that said A side contains an effective amount of surfactant, and preferably silicon-containing surfactant, to ensure the formation of insulating effective cells in the foam. In such embodiments it is possible, although not necessarily preferred, that water is present in the B side of the foamable system. In preferred embodiments, however, the effective amount of surfactant is contained in the A side and there is not a substantial amount of water in the B side composition, preferably not greater than about 1 weight % water, more preferably not more than 0.75 weight % water, and even more preferably not more than 0.5 weight % water.

In other aspects of the invention, the methods comprise introducing at least the portion of the blowing agent containing the hydrohaloolefin into the foaming reaction using a stream that is separate from the stream containing the amine-containing catalyst, and in preferred embodiments separate from both the A side and the B side of the foaming system. In other aspects of the invention, the methods comprise introducing at least the portion of the catalyst containing the amine into the foaming reaction using a stream that is separate from the A side and the B side of the foaming system. In yet other aspects of the invention, the methods comprise introducing at least an effective amount of a silicon-containing surfactant into the foaming reaction using a stream that is separate from any stream which contains both hydrofluoroolefin and amine-containing catalyst, and preferably in certain embodiments separate from both the A side and the B side of the foaming system.

Although each of the above embodiments can be readily adapted by those skilled in the art to achieve the objects of the present invention, applicants believe that embodiments which avoid the addition of water as a co-blowing agent to the polyol premix, or "B" side component, are at once capable of extending the shelf life of such polyol premixes containing hydrohaloolefins, such as, but not limited to HFO-1234ze(E) and HFCO-1233zd(E), but also can be implemented with little or no additional change to existing foaming system. For this reason, such embodiments are frequently preferred, especially since such embodiments permit the production of good quality foams even after the polyol blend has been aged several weeks or months.

The present invention also provides foamable systems comprising at least a first composition and a second composition, and means for storing said first composition separate from said second composition, said first composition comprising at least one polyol and said second composition comprising at least one isocyanate reactive with said polyol, said system further comprising a decomposition reactive hydrohalocarbon and an amine-containing catalyst, each of which is independently contained in said first composition, said second composition, or in both compositions, provided that if a substantial portion of each of said reactive hydrohalocarbon and said amine-containing catalyst are contained in the same composition than that composition does not contain a substantial amount of a polar solvent, and even more preferably does not contain a substantial amount of water.

In another embodiment of the foamable systems of the present invention, the system comprises at least a first composition and a second composition, and means for storing said first composition separate from said second composition, said first composition comprising at least one polyol and said second composition comprising at least one isocyanate reactive with said polyol, said system further comprising a decomposition reactive hydrohalocarbon, an amine-containing catalyst and a silicone-containing surfactant, each of which is independently contained in said first composition, in said second composition, or in both compositions, provided that if a substantial portion of each of said reactive hydrohalocarbon and said amine-containing catalyst are contained in the same composition then the composition that contains said substantial amount of both of said components either (i) does not also contain more than about 1% by weight of a polar solvent, and even more preferably does not contain a substantial amount of water; and/or (ii) does not also contain a substantial amount of said silicone surfactant. In highly preferred embodiments, the silicone-containing surfactant is contained in a composition which does not include any substantial amount hydrohalocarbon and said amine-containing catalyst.

In other aspects, the invention relates to rigid to semi-rigid, polyurethane and polyisocyanurate foams made from the methods of the invention, which foams are preferably characterized by a fine uniform cell structure and little or no foam collapse. The preferred foams are produced with an organic polyisocyanate and a polyol premix composition which comprises a combination of a blowing agent, which is preferably comprises hydrohaloolefin, a polyol, a silicone surfactant, and an amine-containing catalyst and has not greater than about 1 weight % water, preferably not more than 0.75 weight % water, and more preferably not more than 0.5 weight % water, and most preferably is substantially free of any added water typically used in polyurethane and/or polyisocyanurate foam formulations.

DETAILED DESCRIPTION OF PREFERRED EMBODIMENTS

Preferred aspects of the invention provide a polyol premix composition which comprises a combination of a blowing agent, one or more polyols, one or more silicone surfactants, and a catalyst, wherein the blowing agent comprises a hydrohaloolefin, and optionally a hydrocarbon, fluorocarbon, chlorocarbon, hydrochlorofluorocarbon, hydrofluorocarbon, halogenated hydrocarbon, ether, ester, alcohol, aldehyde, ketone, organic acid, gas generating material, or combinations thereof and wherein the polyol blend is has not greater than about 1 weight % water, preferably not more than 0.75 weight % water, and more preferably not more than 0.5 weight % water, and most preferably is substantially free of any added water. As used herein, the term "substantially free of water" means not including any water other than any water that may be an impurity in one of the other raw materials.

Another preferred embodiment of the invention provides a method of preparing a polyurethane or polyisocyanurate foam comprising reacting an organic polyisocyanate with the polyol premix composition and optionally adding water as a third chemical component.

The present invention in certain aspects provides a blowing agent that comprises a hydrohaloolefin, preferably comprising at least one of HFO-1234ze(E) and HFCO-1233zd(E), and optionally a hydrocarbon, fluorocarbon, chlorocarbon, fluorochlorocarbon, halogenated hydrocarbon, ether, fluorinated ether, ester, alcohol, aldehyde, ketone, organic acid, gas generating material (excluding water), or combinations thereof. The hydrohaloolefin preferably comprises at least one halooalkene such as a fluoroalkene or chlorofluoroalkene containing from 3 to 4 carbon atoms and at least one carbon-carbon double bond. Preferred hydrohaloolefins non-exclusively include trifluoropropenes, tetrafluoropropenes such as (HFO-1234), pentafluoropropenes such as (HFO-1225), chlorotrifloropropenes such as (HFO-1233), chlorodifluoropropenes, chlorotrifluoropropenes, chlorotetrafluoropropenes, and combinations of these. It is generally preferred that the compounds of the present invention are the tetrafluoropropene, pentafluoropropene, and chlorotrifloropropene compounds in which the unsaturated terminal carbon has not more than one F or Cl substituent. Included are 1,3,3,3-tetrafluoropropene (HFO-1234ze); 1,1,3,3-tetrafluoropropene; 1,2,3,3,3-pentafluoropropene (HFO-1225ye), 1,1,1-trifluoropropene; 1,2,3,3,3-pentafluoropropene, 1,1,1,3,3-pentafluoropropene (HFO-1225zc) and 1,1,2,3,3-pentafluoropropene (HFO-1225yc); (Z)-1,1,1,2,3-pentafluoropropene (HFO-1225yez); 1-chloro-3,3,3-trifluoropropene (HFCO-1233zd) or combinations thereof, and any and all stereoisomers of each of these.

The preferred hydrohaloolefins have a Global Warming Potential (GWP) of not greater than 150, more preferably not greater than 100 and even more preferably not greater than 75. As used herein, "GWP" is measured relative to that of carbon dioxide and over a 100-year time horizon, as defined in "The Scientific Assessment of Ozone Depletion, 2002, a report of the World Meteorological Association's Global Ozone Research and Monitoring Project," which is incorporated herein by reference. Preferred hydrohaloolefins also preferably have an Ozone Depletion Potential (ODP) of not greater than 0.05, more preferably not greater than 0.02 and even more preferably about zero. As used herein, "ODP" is as defined in "The Scientific Assessment of Ozone Depletion, 2002, A report of the World Meteorological Association's Global Ozone Research and Monitoring Project," which is incorporated herein by reference.

Preferred optional blowing agents non-exclusively include water, organic acids that produce $CO_2$ and/or CO, hydrocarbons; ethers, halogenated ethers; esters, alcohols, aldehydes, ketones, pentafluorobutane; pentafluoropropane; hexafluoropropane; heptafluoropropane; trans-1,2dichloroethylene; methylal, methyl formate; 1-chloro-1,2,2,2-tetrafluoroethane (HCFC-124); 1,1-dichloro-1-fluoroethane (HCFC-141b); 1,1,1,2-tetrafluoroethane (HFC-134a); 1,1,2,2-tetrafluoroethane (HFC-134); 1-chloro 1,1-difluoroethane (HCFC-142b); 1,1,1,3,3-pentafluorobutane (HFC-365mfc); 1,1,1,2,3,3,3-heptafluoropropane (HFC-227ea); trichlorofluoromethane (CFC-11); dichlorodifluoromethane (CFC-12); dichlorofluoromethane (HCFC-22); 1,1,1,3,3,3-hexafluoropropane (HFC-236fa); 1,1,1,2,3,3-hexafluoropropane (HFC-236e); 1,1,1,2,3,3,3-heptafluoropropane (HFC-227ea), difluoromethane (HFC-32); 1,1-difluoroethane (HFC-152a); 1,1,1,3,3-pentafluoropropane (HFC-245fa); butane; isobutane; normal pentane; isopentane; cyclopentane, or combinations thereof. The blowing agent component is usually present in the polyol premix composition in an amount of from about 1 wt. % to about 30 wt. %, preferably from about 3 wt. % to about 25 wt. %, and more preferably from about 5 wt. % to about 25 wt. %, by weight of the polyol premix composition. When both a hydrohaloolefin and an optional blowing agent are present, the hydrohaloolefin component is preferably present in the blowing agent component in an amount of from about 5 wt. % to about 90 wt. %, preferably from about 7 wt. % to about 80 wt. %, and more preferably from about 10 wt. % to about 70 wt. %, by weight of the blowing agent component; and the optional blowing agent is usually present in the blowing agent component in an amount of from about 95 wt. % to about 10 wt. %, preferably from about 93 wt. % to about 20 wt. %, and more preferably from about 90 wt. % to about 30 wt. %, by weight of the blowing agent component.

The polyol component, which may include mixtures of polyols, can be any polyol which reacts in a known fashion with an isocyanate in preparing a polyurethane or polyisocyanurate foam. Useful polyols comprise one or more of a sucrose containing polyol; phenol, a phenol formaldehyde containing polyol; a glucose containing polyol; a sorbitol containing polyol; a methylglucoside containing polyol; an aromatic polyester polyol; glycerol; ethylene glycol; diethylene glycol; propylene glycol; graft copolymers of polyether polyols with a vinyl polymer; a copolymer of a polyether polyol with a polyurea; one or more of (a) condensed with one or more of (b): (a) glycerine, ethylene glycol, diethylene glycol, trimethylolpropane, ethylene diamine, pentaerythritol, soy oil, lecithin, tall oil, palm oil, castor oil; (b) ethylene oxide, propylene oxide, a mixture of ethylene oxide and propylene oxide; or combinations thereof. The polyol component is preferably present in the polyol premix composition in an amount of from about 60 wt. % to about 95 wt. %, preferably from about 65 wt. % to about 95 wt. %, and more preferably from about 70 wt. % to about 90 wt. %, by weight of the polyol premix composition.

As mentioned above, the polyol premix composition preferably also contains at least one silicone-containing surfactant. The silicone-containing surfactant is used to aid in the formation of foam from the mixture, as well as to control the size of the bubbles of the foam so that a foam of a desired cell structure is obtained. Preferably, a foam with small bubbles or cells therein of uniform size is desired since it has the most desirable physical properties such as compressive strength and thermal conductivity. Also, it is critical to have a foam with stable cells which do not collapse prior to forming or during foam rise.

Silicone surfactants for use in the preparation of polyurethane or polyisocyanurate foams are available under a number of trade names known to those skilled in this art. Such materials have been found to be applicable over a wide range of formulations allowing uniform cell formation and maximum gas entrapment to achieve very low density foam structures. The preferred silicone surfactant comprises a polysiloxane polyoxyalkylene block co-polymer. Some representative silicone surfactants useful for this invention are Momentive's L-5130, L-5180, L-5340, L-5440, L-6100, L-6900, L-6980 and L-6988; Air Products DC-193, DC-197, DC-5582, and DC-5598; and B-8404, B-8407, B-8409 and B-8462 from Goldschmidt AG of Essen, Germany. Others are disclosed in U.S. Pat. Nos. 2,834,748; 2,917,480; 2,846,458 and 4,147,847. The silicone surfactant component is usually present in the polyol premix composition in an amount of from about 0.5 wt. % to about 5.0 wt. %, preferably from about 1.0 wt. % to about 4.0 wt. %, and more preferably from about 1.5 wt. % to about 3.0 wt. %, by weight of the polyol premix composition.

The polyol premix composition may optionally contain a non-silicone surfactant, such as a non-silicone, non-ionic surfactant. Such may include oxyethylated alkylphenols, oxyethylated fatty alcohols, paraffin oils, castor oil esters, ricinoleic acid esters, turkey red oil, groundnut oil, paraffins, and fatty alcohols. A preferred non-silicone non-ionic surfactant is LK-443 which is commercially available from Air Products Corporation. When a non-silicone, non-ionic surfactant used, it is usually present in the polyol premix composition in an amount of from about 0.25 wt. % to about 3.0 wt. %, preferably from about 0.5 wt. % to about 2.5 wt. %, and more preferably from about 0.75 wt. % to about 2.0 wt. %, by weight of the polyol premix composition.

The inventive polyol premix composition preferably contains a catalyst or catalysts. Useful are primary amine, secondary amine or tertiary amine. Useful tertiary amine catalysts non-exclusively include N,N,N',N'',N''-pentamethyldiethyltriamine, N,N-dicyclohexylmethylamine; N,N-ethyldiisopropylamine; N,N-dimethylcyclohexylamine; N,N-dimethylisopropylamine; N-methyl-N-isopropylbenzylamine; N-methyl-N-cyclopentylbenzylamine; N-isopropyl-N-sec-butyl-trifluoroethylamine; N,N-diethyl-α-phenylethyl)amine, N,N,N-tri-n-propylamine, or combinations thereof. Useful secondary amine catalysts non-exclusively include dicyclohexylamine; t-butylisopropylamine; di-t-butylamine; cyclohexyl-t-butylamine; di-sec-butylamine, dicyclopentylamine; di-α-trifluoromethylethyl)amine; di-(α-phenylethyl)amine; or combinations thereof. Useful primary amine catalysts non-exclusively include: triphenylmethylamine and 1,1-diethyl-n-propylamine.

Other useful amines includes morpholines, imidazoles, ether containing compounds, and the like. These include
dimorpholinodiethylether
N-ethylmorpholine
N-methylmorpholine
bis(dimethylaminoethyl)ether
imidizole
n-methylimidazole
1,2-dimethylimidazole
dimorpholinodimethylether
N,N,N',N',N'',N''-pentamethyldiethylenetriamine
N,N,N',N',N'',N''-pentaethyldiethylenetriamine
N,N,N',N',N'',N''-pentamethyldipropylenetriamine
bis(diethylaminoethyl)ether
bis(dimethylaminopropyl)ether.

The preparation of polyurethane or polyisocyanurate foams using the compositions described herein may follow any of the methods well known in the art can be employed, see Saunders and Frisch, Volumes I and II Polyurethanes Chemistry and technology, 1962, John Wiley and Sons, New York, N.Y. or Gum, Reese, Ulrich, Reaction Polymers, 1992, Oxford University Press, New York, N.Y. or Klempner and Sendijarevic, Polymeric Foams and Foam Technology, 2004, Hanser Gardner Publications, Cincinnati, Ohio. In general, polyurethane or polyisocyanurate foams are prepared by combining an isocyanate, the polyol premix composition, and other materials such as optional flame retardants, colorants, or other additives. These foams can be rigid, flexible, or semi-rigid, and can have a closed cell structure, an open cell structure or a mixture of open and closed cells.

It is convenient in many applications to provide the components for polyurethane or polyisocyanurate foams in pre-blended formulations. Most typically, the foam formulation is pre-blended into two components. The isocyanate and optionally other isocyanate compatible raw materials, including but not limited to blowing agents and certain silicone surfactants, comprise the first component, commonly referred to as the "A" component. The polyol mixture composition, including surfactant, catalysts, blowing agents, and optional other ingredients comprise the second component, commonly referred to as the "B" component. In any given application, the "B" component may not contain all the above listed components, for example some formulations omit the flame retardant if flame retardancy is not a required foam property. Accordingly, polyurethane or polyisocyanurate foams are readily prepared by bringing together the A and B side components either by hand mix for small preparations and, preferably, machine mix techniques to form blocks, slabs, laminates, pour-in-place panels and other items, spray applied foams, froths, and the like. Optionally, other ingredients such as fire retardants, colorants, auxiliary blowing agents, water, and even other polyols can be added as a stream to the mix head or reaction site. Most conveniently, however, they are all, with the exception of water, incorporated into one B component as described above.

A foamable composition suitable for forming a polyurethane or polyisocyanurate foam may be formed by reacting an organic polyisocyanate and the polyol premix composition described above. Any organic polyisocyanate can be employed in polyurethane or polyisocyanurate foam synthesis inclusive of aliphatic and aromatic polyisocyanates. Suitable organic polyisocyanates include aliphatic, cycloaliphatic, araliphatic, aromatic, and heterocyclic isocyanates which are well known in the field of polyurethane chemistry. These are described in, for example, U.S. Pat. Nos. 4,868,224; 3,401,190; 3,454,606; 3,277,138; 3,492,330; 3,001,973; 3,394,164; 3,124.605; and 3,201,372. Preferred as a class are the aromatic polyisocyanates.

Representative organic polyisocyanates correspond to the formula:

$$R(NCO)_z$$

wherein R is a polyvalent organic radical which is either aliphatic, aralkyl, aromatic or mixtures thereof, and z is an integer which corresponds to the valence of R and is at least two. Representative of the organic polyisocyanates contemplated herein includes, for example, the aromatic diisocyanates such as 2,4-toluene diisocyanate, 2,6-toluene diisocyanate, mixtures of 2,4- and 2,6-toluene diisocyanate, crude toluene diisocyanate, methylene diphenyl diisocyanate, crude methylene diphenyl diisocyanate and the like; the aromatic triisocyanates such as 4,4',4''-triphenylmethane triisocyanate, 2,4,6-toluene triisocyanates; the aromatic tetraisocyanates such as 4,4'-dimethyldiphenylmethane-2,2'5,5-'tetraisocyanate, and the like; arylalkyl polyisocyanates such as xylylene diisocyanate; aliphatic polyisocyanate such as hexamethylene-1,6-diisocyanate, lysine diisocyanate methylester and the like; and mixtures thereof. Other organic polyisocyanates include polymethylene polyphenylisocyanate, hydrogenated methylene diphenylisocyanate, m-phenylene diisocyanate, naphthylene-1,5-diisocyanate, 1-methoxyphenylene-2,4-diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyl-diphenylmethane-4,4'-diisocyanate; Typical aliphatic polyisocyanates are alkylene diisocyanates such as trimethylene diisocyanate, tetramethylene diisocyanate, and hexamethylene diisocyanate, isophorene diisocyanate, 4,4'-methylenebis(cyclohexyl isocyanate), and the like; typical aromatic polyisocyanates include m-, and p-phenylene disocyanate, polymethylene polyphenyl isocyanate, 2,4- and 2,6-toluene-diisocyanate, dianisidine diisocyanate, bitoylene isocyanate, naphthylene 1,4-diisocyanate, bis(4-isocyanatophenyl) methene, bis(2-methyl-4-isocyanatophenyl)methane, and the like. Preferred polyisocyanates are the polymethylene polyphenyl isocyanates, Particularly the mixtures containing from about 30 to about 85 percent by weight of methylenebis (phenyl isocyanate) with the remainder of the mixture comprising the polymethylene polyphenyl polyisocyanates of functionality higher than 2. These polyisocyanates are prepared by conventional methods known in the art. In the present invention, the polyisocyanate and the polyol are employed in amounts which will yield an NCO/OH stoichiometric ratio in a range of from about 0.9 to about 5.0. In the present invention, the NCO/OH equivalent ratio is, preferably, about 1.0 or more and about 3.0 or less, with the ideal range being from about 1.1 to about 2.5. Especially suitable organic polyisocyanate include polymethylene polyphenyl isocyanate, methylenebis(phenyl isocyanate), toluene diisocyanates, or combinations thereof.

In the preparation of polyisocyanurate foams, trimerization catalysts are used for the purpose of converting the blends in conjunction with excess A component to polyisocyanurate-polyurethane foams. The trimerization catalysts employed can be any catalyst known to one skilled in the art, including, but not limited to, glycine salts, tertiary amine trimerization catalysts, quaternary ammonium carboxylates, and alkali metal carboxylic acid salts and mixtures of the various types of catalysts. Preferred species within the classes are potassium acetate, potassium octoate, and N-(2-hydroxy-5-nonylphenol)methyl-N-methylglycinate.

Conventional flame retardants can also be incorporated, preferably in amount of not more than about 20 percent by weight of the reactants. Optional flame retardants include tris(2-chloroethyl)phosphate, tris(2-chloropropyl)phosphate, tris(2,3-dibromopropyl)phosphate, tris(1,3-dichloropropyl)phosphate, tri(2-chloroisopropyl)phosphate, tricresyl phosphate, tri(2,2-dichloroisopropyl)phosphate, diethyl N,N-bis(2-hydroxyethyl)aminomethylphosphonate, dimethyl methylphosphonate, tri(2,3-dibromopropyl)phosphate, tri(1,3-dichloropropyl)phosphate, and tetra-kis-(2-chloroethyl)ethylene diphosphate, triethylphosphate, diammonium phosphate, various halogenated aromatic compounds, antimony oxide, aluminum trihydrate, polyvinyl chloride, melamine, and the like. Other optional ingredients can include from 0 to about 7 percent water, which chemically reacts with the isocyanate to produce carbon dioxide. This carbon dioxide acts as an auxiliary blowing agent. In the case of this invention, the water cannot be added to the polyol blend but, if used, can be added as a separate chemical stream. Formic acid is also used to produce carbon dioxide by reacting with the isocyanate and is optionally added to the "B" component.

In addition to the previously described ingredients, other ingredients such as, dyes, fillers, pigments and the like can be included in the preparation of the foams. Dispersing agents and cell stabilizers can be incorporated into the present blends. Conventional fillers for use herein include, for example, aluminum silicate, calcium silicate, magnesium silicate, calcium carbonate, barium sulfate, calcium sulfate, glass fibers, carbon black and silica. The filler, if used, is normally present in an amount by weight ranging from about 5 parts to 100 parts per 100 parts of polyol. A pigment which can be used herein can be any conventional pigment such as titanium dioxide, zinc oxide, iron oxide, antimony oxide, chrome green, chrome yellow, iron blue siennas, molybdate oranges and organic pigments such as para reds, benzidine yellow, toluidine red, toners and phthalocyanines.

The polyurethane or polyisocyanurate foams produced can vary in density from about 0.5 pounds per cubic foot to about 60 pounds per cubic foot, preferably from about 1.0 to 20.0 pounds per cubic foot, and most preferably from about 1.5 to 6.0 pounds per cubic foot. The density obtained is a function of how much of the blowing agent or blowing agent mixture disclosed in this invention plus the amount of auxiliary blowing agent, such as water or other co-blowing agents is present in the A and/or B components, or alternatively added at the time the foam is prepared. These foams can be rigid, flexible, or semi-rigid foams, and can have a closed cell structure, an open cell structure or a mixture of open and closed cells. These foams are used in a variety of well known applications, including but not limited to thermal insulation, cushioning, flotation, packaging, adhesives, void filling, crafts and decorative, and shock absorption.

The following non-limiting examples serve to illustrate the invention.

Example 1 (Comparative Example)

A polyol (B Component) formulation was made up of 100 parts by weight of a polyol blend, 1.5 parts by weight Niax L6900 silicone surfactant, 1.5 parts by weight water, 4.0 parts by weight N,N-dicyclohexylmethylamine (sold as Polycat 12 by Air Products and Chemicals) catalyst, and 8 parts by weight trans-1,3,3,3-tetrafluoropropene blowing agent. The total B component composition, when freshly prepared and combined with 120.0 parts by weight of Lupranate M20S polymeric isocyanate yielded a good quality foam with a fine and regular cell structure. Foam reactivity was typical for a pour in place foam. The total B-side composition (115.0 parts) was then aged at 130° F. for 336 hours, and then combined with 120.0 parts of M20S polymeric isocyanate to make a foam. The foam was very poor in appearance with significant cell collapse. Significant yellowing of the polyol premix was noted during aging.

Example 2 (Foam Test)

A polyol (B Component) formulation was made up of 100 parts by weight of a polyol blend, 1.5 parts by weight Niax L6900 silicone surfactant, 0.0 parts by weight water, 2.0 parts by weight N,N-dicyclohexylmethylamine (sold as Polycat 12 by Air Products and Chemicals) catalyst, and 8 parts by weight trans-1,3,3,3-tetrafluoropropene blowing agent. The total B component composition, when freshly prepared and combined with 120.0 parts by weight of Lupranate M20S polymeric isocyanate yielded a good quality foam with a fine and regular cell structure. Foam reactivity was typical for a pour in place foam. The total B-side composition (114.75 parts) was then aged at 130° F. for 336 hours, and then combined with 120.0 parts of M20S polymeric isocyanate to make a foam. The foam was excellent in appearance with no evidence of cell collapse. There was only slight yellowing of the polyol premix noted during aging. The foam exhibited acceptable k-values. As used herein, k-value is defined as the rate of transfer of heat energy by conduction through one square foot of one-inch thick homogenous material in one hour where there is a difference of one degree Fahrenheit perpendicularly across the two surfaces of the material.

Example 3 (Comparative Example)

A polyol (B Component) formulation was made up of 100 parts by weight of a polyol blend, 1.5 parts by weight Niax L6900 silicone surfactant, 1.5 parts by weight water, 1.2 parts by weight N,N,N',N',N'',N''-pentamethyldiethyltriamine (sold as Polycat 5 by Air Products and Chemicals) catalyst, and 8 parts by weight trans-1-chloro-3,3,3-tetrafluoropropene blowing agent. The total B component composition, when freshly prepared and combined with 120.0 parts by weight of Lupranate M20S polymeric isocyanate yielded a good quality foam with a fine and regular cell structure. Foam reactivity was typical for a pour in place foam. The total B-side composition (115.0 parts) was then aged at 130° F. for 336 hours, and then combined with 120.0 parts of M20S polymeric isocyanate to make a foam. The foam was very poor in appearance with almost 100% cell collapse. Significant yellowing of the polyol premix was noted during aging.

Example 4 (Foam Test)

A polyol (B Component) formulation was made up of 100 parts by weight of a polyol blend, 1.5 parts by weight Niax L6900 silicone surfactant, 0.0 parts by weight water, 1.2 parts by weight N,N,N',N',N'',N''-pentamethyldiethyltriamine (sold as Polycat 5 by Air Products and Chemicals) catalyst, and 8 parts by weight trans-1,3,3,3-tetrafluoropropene blowing agent. The total B component composition, when freshly prepared and combined with 120.0 parts by weight of Lupranate M20S polymeric isocyanate yielded a good quality foam with a fine and regular cell structure. Foam reactivity was typical for a pour in place foam. The total B-side composition (114.75 parts) was then aged at 130° F. for 336 hours, and then combined with 120.0 parts of M20S polymeric isocyanate to make a foam. The foam was excellent in appearance with only moderate evidence of cell collapse. There was only slight yellowing of the polyol premix noted during aging.

What is claimed is:

1. A foam forming method comprising:
   (a) providing a foamable system comprising: (i) polyol contained in a B-side; (ii) isocyanate reactive with said polyol in an A-side; (ii) a catalytically effective amount of an amine-containing catalyst; and (iii) blowing agent comprising trans-1-chloro-3,3,3-trifluoropropene (transHFCO-1233zd) and water, wherein said transHFCO-1233zd is decomposition reactive with said amine-containing catalyst, said providing step comprising forming said B-side to include said trans-1-chloro-3,3,3-trifluoropropene (transHFCO-1233zd) and said amine-containing catalyst, and to be substantially free of water;
   (b) storing said B-side for a storage period of at least about 2 months; and
   (c) after said storage step (b) forming a foam from the foamable system provided in step (a) by mixing said stored B-side with said A-side.

2. The foam forming method of claim 1 wherein said B side is storage stable for a period of at least about 3 months.

3. The foam forming method of claim 1 wherein said B side is storage stable for a period of at least about 6 months.

4. The foam forming method of claim 1 wherein said B side does not contain a substantial amount of a polar solvent.

5. The foam forming method of claim 1 wherein said B side is substantially free of polar solvents.

6. The foam forming method of claim 1 wherein a gas-generating co-blowing agent other than water is included in said A side, said B side, or both.

7. The foam forming method of claim 6 wherein said gas-generating co-blowing agent comprises formic acid.

8. The foam forming method of claim 1 wherein said B side is storage stable for a period of at least about 2 months.

9. A foam formed from the method of claim 1.

* * * * *